US009865226B2

(12) United States Patent
Buckett et al.

(10) Patent No.: US 9,865,226 B2
(45) Date of Patent: Jan. 9, 2018

(54) IMAGE COLOR CORRECTION FOR ELECTRONIC DISPLAYS

(71) Applicant: International Business Machines Corporation, Armonk, NY (US)

(72) Inventors: Roger A. Buckett, Winchester (GB); Stuart J. Reece, Winchester (GB); John A. Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 14/478,079

(22) Filed: Sep. 5, 2014

(65) Prior Publication Data

US 2016/0071483 A1  Mar. 10, 2016

(51) Int. Cl.
*G09G 5/02* (2006.01)
*G06F 3/14* (2006.01)

(52) U.S. Cl.
CPC ............. *G09G 5/02* (2013.01); *G06F 3/1415* (2013.01); *G09G 2320/0242* (2013.01); *G09G 2320/0666* (2013.01); *G09G 2320/103* (2013.01)

(58) Field of Classification Search
None
See application file for complete search history.

(56) References Cited

U.S. PATENT DOCUMENTS

| 5,153,929 | A | 10/1992 | Itagaki | |
|---|---|---|---|---|
| 5,598,184 | A | 1/1997 | Barkans | |
| 5,999,688 | A * | 12/1999 | Iggulden | G11B 15/023 348/E7.091 |
| 7,011,413 | B2 | 3/2006 | Wada | |
| 7,796,140 | B2 | 9/2010 | Fujimori | |
| 7,822,269 | B2 | 10/2010 | Tsukada | |
| 8,913,827 | B1 | 12/2014 | Fang | |
| 2003/0231191 | A1* | 12/2003 | Glen | G06F 3/14 345/690 |
| 2004/0047614 | A1* | 3/2004 | Green | H04N 5/783 386/217 |
| 2005/0141622 | A1* | 6/2005 | Seo | H04N 19/176 375/240.27 |
| 2006/0067574 | A1* | 3/2006 | Perlmutter | G06K 9/342 382/164 |
| 2011/0169854 | A1 | 7/2011 | Hikosaka | |

(Continued)

FOREIGN PATENT DOCUMENTS

JP  WO2011048623 A1  3/2013

*Primary Examiner* — Aaron M Richer
(74) *Attorney, Agent, or Firm* — Daniel C. Housley

(57) ABSTRACT

A method of electronic image color correction may include receiving a first frame including pixel data for a first color component for a plurality of pixels. The method may include generating saved pixel data for the first color component and receiving a second frame subsequent to the first frame. The second frame may include pixel data for the first color component for the plurality of pixels. The method may include generating substitute pixel data for the first color component in response to determining that, in the second frame, the pixel data for the first color component is triggered by a threshold value for a particular percentage of the plurality of pixels. The substitute pixel data may be generated based on the saved pixel data. The method may include displaying the second frame using the substitute pixel data for the first color component for the plurality of pixels.

20 Claims, 6 Drawing Sheets

(56) References Cited

U.S. PATENT DOCUMENTS

| | | |
|---|---|---|
| 2013/0113975 A1 | 5/2013 | Gabris |
| 2013/0121566 A1 | 5/2013 | Paris et al. |
| 2015/0109486 A1* | 4/2015 | Ramalingaiah ........ H04N 5/232 348/241 |
| 2016/0027406 A1* | 1/2016 | Fiedler ................ G06F 11/1004 345/501 |
| 2016/0088266 A1 | 3/2016 | Du et al. |

* cited by examiner

| | Pixel 402 | | | Pixel 404 | | | Pixel 406 | | | Pixel 408 | | |
|---|---|---|---|---|---|---|---|---|---|---|---|---|
| | R 302 | G 304 | B 306 | R 302 | G 304 | B 306 | R 302 | G 304 | B 306 | R 302 | G 304 | B 306 |
| Frame 410 | 122 | 27 | 0 | 88 | 120 | 32 | 79 | 12 | 11 | 3 | 200 | 150 |
| Frame 412 | 123 | 28 | 1 | 88 | 120 | 32 | 79 | 12 | 10 | 122 | 200 | 150 |
| Frame 414 | 122 | 27 | 0 | 88 | 121 | 0 | 79 | 12 | 0 | 122 | 201 | 0 |
| Frame 416 | 123 | 88 | 0 | 88 | 120 | 32 | 79 | 12 | 11 | 122 | 200 | 150 |
| Frame 418 | 123 | 28 | 0 | 88 | 120 | 32 | 79 | 12 | 11 | 122 | 200 | 150 |
| Frame 420 | 122 | 28 | 1 | 88 | 122 | 32 | 80 | 12 | 10 | 122 | 200 | 100 |
| Frame 422 | 123 | 28 | 1 | 88 | 121 | 32 | 79 | 12 | 10 | 122 | 200 | 100 |

| | Pixel 402 | | | Pixel 404 | | | Pixel 406 | | | Pixel 408 | | |
|---|---|---|---|---|---|---|---|---|---|---|---|---|
| | 302 | 304 | 306 | 302 | 304 | 306 | 302 | 304 | 306 | 302 | 304 | 306 |
| Frame 410 | 122 | 27 | 0 | 88 | 120 | 32 | 79 | 12 | 11 | 88 | 120 | 32 |
| Frame 412 | 123 | 28 | 1 | 88 | 120 | 32 | 79 | 12 | 10 | 88 | 120 | 32 |
| Frame 414 | 122 | 27 | 0 | 88 | 121 | 0 | 79 | 12 | 0 | 88 | 121 | 0 |
| Frame 416 | 123 | 88 | 1 | 88 | 120 | 32 | 79 | 12 | 10 | 88 | 121 | 32 |
| Frame 418 | 123 | 28 | 1 | 88 | 120 | 32 | 79 | 12 | 10 | 123 | 28 | 32 |
| Frame 420 | 123 | 28 | 1 | 88 | 122 | 32 | 80 | 12 | 10 | 123 | 28 | 1 |
| Frame 422 | 123 | 28 | 0 | 88 | 121 | 32 | 79 | 12 | 10 | 123 | 28 | 1 |

FIG. 4B

IMAGE COLOR CORRECTION FOR ELECTRONIC DISPLAYS

BACKGROUND

The present disclosure relates to image correction, and more specifically, to image color correction in electronic displays.

Electronic displays may provide a visual representation of data received from an image source, such as a computer, external to the display. Wired connections may be used to communicate and transfer data between the display and the computer. In some instances, the connection between the computer and the display may be unreliable and data transmitted may not be successfully received by the display. As a result, the display may present an incorrect representation of the data which may affect a user's ability to read and understand displayed images.

SUMMARY

Embodiments of the present disclosure are directed to a method of electronic image color correction. The method may include receiving a first frame including pixel data for a first color component for a plurality of pixels. The method may include generating saved pixel data for the first color component and receiving a second frame subsequent to the first frame. The second frame may include pixel data for the first color component for the plurality of pixels. The method may include generating substitute pixel data for the first color component in response to determining that, in the second frame, the pixel data for the first color component is triggered by a threshold value for a particular percentage of the plurality of pixels. The substitute pixel data may be generated based on the saved pixel data. The method may include displaying the second frame using the substitute pixel data for the first color component for the plurality of pixels.

Embodiments of the present disclosure are directed to a display apparatus communicatively connected to an image source. The display apparatus may include a connector configured to receive a first frame and receive a second frame subsequent to the first frame. The first and second frames may include pixel data for a first color component for a plurality of pixels.

The display apparatus may include a processor. The processor may be configured to generate saved pixel data for the first color component. The processor may be configured to generate substitute pixel data for the first color component in response to determining that, in the second frame, the pixel data for the first color component is triggered by a threshold value for a particular percentage of the plurality of pixels. The substitute pixel data may be generated based on the saved pixel data. The processor may be configured to cause the display apparatus to display the second frame using the substitute pixel data for the first color component for the plurality of pixels. The display apparatus may include a memory configured to store the pixel data for the first color component and the saved pixel data.

Embodiments of the present disclosure are directed to a system of electronic image color correction. The system may include a computer configured to transmit pixel data for a first color component across a first connection and pixel data for a second color component across a second connection. The system may include a display apparatus communicatively connected to the computer. The display apparatus may be configured to receive the pixel data for the first color component from across the first connection and the pixel data for the second color component from across the second connection. The display apparatus may be configured to cause the computer to transmit the pixel data for the first color component across the second connection in response to determining that the pixel data for the first color component is triggered by a threshold value for a particular percentage of a plurality of pixels.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 4A-4B depict a table displaying implementation of color correction for pixels over multiple frames according to embodiments of the present disclosure.

Figure 1:
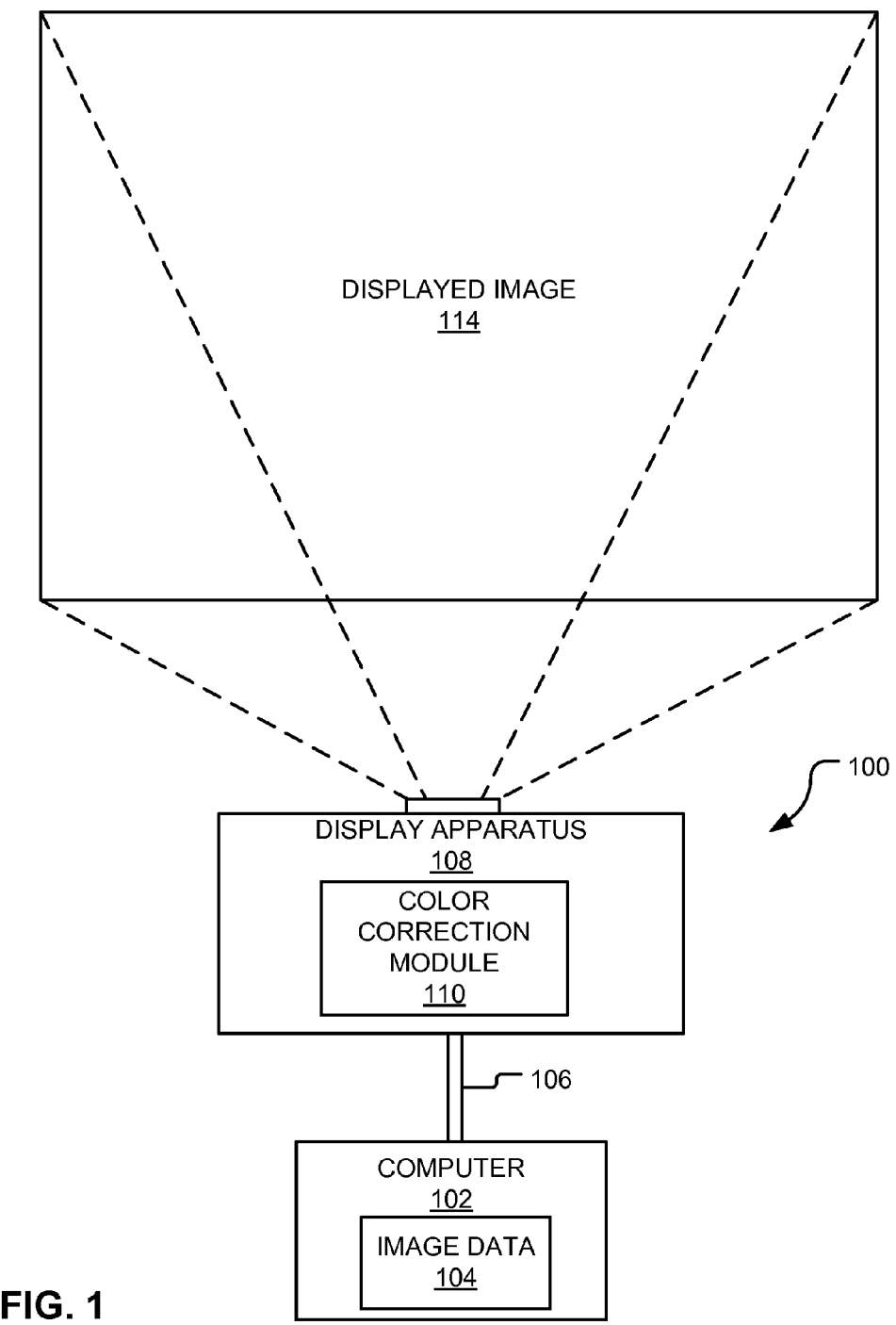
FIG. 1 depicts a system for image color correction according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to image correction, more particular aspects relate to color correction for electronic displays. While the present disclosure is not necessarily limited to such applications, various aspects of the disclosure may be appreciated through a discussion of various examples using this context.

While the same nomenclature and same numbers may be used to identify elements throughout the disclosure, this practice is not intended to limit the scope of the disclosure. Identified elements in one figure may not be identical to other same named or identified elements in other figures.

Computer displays, such as computer monitors, projectors, or other suitable display may provide an electronic visual representation of data received from computer elements within the display or from one or more elements external to the display. In order for a computer external to the display to communicate and transfer data, the computer and display may be connected together using a wired connection or other suitable connection. Wired connections between the computer and the display may include, but are not limited to, a DVI connection, a RCA connection, an S-Video connection, a VGA connection, and an HDMI connection. In certain embodiments, the display may be wirelessly connected to a computer in order to transmit and receive data.

However, in some instances the connection between the computer and the display may be unreliable, and data transmitted may be corrupted, interrupted, or otherwise not successfully received by the display. Unreliable connections may be the result of faulty cables, faulty ports, interference, or from other faults or errors. In the case of an unreliable connection, pixel data for one or more pixels in image frames ("frames"), may not be received by the computer display.

A frame is a single representation of an image received from the computer. The image may be represented by a plurality of frames which are flashed on the display for a relatively short period of time (for example, $\frac{1}{30}^{th}$ of a second) and then immediately replaced by a next frame. The frames blend together to produce the image transmitted from the computer.

Each frame may be made up of a plurality of pixels which display as one or more colors to represent the intended image from the computer. Thus, the frame may include pixel data for the plurality of pixels in the frame. The pixel data may include values for one or more color components in each pixel. The color components in each pixel may determine which color each pixel will display. For example, where each pixel is represented by an RGB color model, the pixel may be made up of a red, green, and blue color component. The value of each color component dictates a combination of red, green, and blue to create a combined color that the pixel will display. In embodiments, the color components may be based on a different color model such as a CMYK color model or other suitable color model.

As a result of unreliable communication of pixel data, the display may present an incorrect representation of the image. For example, the presented image may go to all one color, lose one or more colors completely (for example, no red component), or present with other display errors when pixel data is not successfully communicated between the devices.

Embodiments of the present disclosure are directed toward a computer implemented system designed for image color correction. The system may be configured to receive a first frame including pixel data for a first color component for a plurality of pixels and generate saved pixel data for the first color component. The system may be configured to receive a second frame subsequent to the first frame, the second frame including pixel data for the first color component for the plurality of pixels. The system may be configured to generate substitute pixel data for the first color component in response to determining that, in the second frame, the pixel data for the first color component is triggered by a threshold value for a particular percentage of the plurality of pixels. The substitute pixel data may be generated based on the saved pixel data. The system may be configured to display the second frame using the substitute pixel data for the first color component for the plurality of pixels.

Referring now to FIG. 1 a system 100 for image color correction may be seen according to embodiments of the present disclosure. The system may include a computer 102 having image data 104, and a display apparatus 108 having a color correction module 110. When the display apparatus 108 is in use, the display apparatus may generate a displayed image 114. The computer 102 and the display apparatus 108 may be communicatively connected via a cable 106.

The computer 102 may be a device having memory and one or more processors. The computer 102 may store and access data, execute one or more processes, communicate via the cable 106, generate image data 104, and perform other functions. In embodiments, the computer 102 may be a device such as a smart phone, tablet computer, laptop, smart watch, desktop, video game console, video disk player, a device for receiving streaming media from the internet, or other suitable computing device. The memory of the computer 102 may store data, a user interface, executable software, a software client, image data 104, and other data.

The image data 104 may be data readable by a display to generate an image. The image data 104 may cause the display to generate various types of images including, but not limited to video, pictures, and other images. The image data 104 may be generated and transmitted to the display apparatus 108 in real time such that the display apparatus 108 continually displays up to date information from the computer 102. For example, one or more frames including pixel data may be transmitted to the display apparatus 108 as they are generated by the computer 102. The frames and pixel data may be the same or substantially similar as described herein.

The display apparatus 108 is a device capable of receiving image data 104 from the computer 102 and producing a displayed image 114 from the image data 104. The display apparatus 108 may include a memory and one or more processors. The display apparatus 108 may store and access data, execute one or more processes, communicate via the cable 106, perform color correction, and perform other functions. In embodiments, the display apparatus 108 may be a LED display, a LCD display, a CRT display, a projector, or other suitable device.

The display apparatus 108 may include the image color correction module 110. The image color correction module 110 may be software and/or hardware configured to perform image color correction according to embodiments of the present disclosure.

To perform image color correction, the color correction module 110 may be configured to receive a first frame including pixel data for a first color component for a plurality of pixels. The color correction module 110 may determine whether the pixel data for the first color component is of a value which triggers a threshold value for a particular percentage of the plurality of pixels in the first frame.

Each frame may include pixel data for one or more color components for the plurality of pixels in the frame, as described herein. For example, in a display utilizing an RGB color model, the plurality of pixels may include first, second, and third color components indicating how much of each of the red, green, and blue is included. The color of each pixel in the display may be expressed as an RGB triplet (red, green, and blue) where each component may vary from zero to a defined maximum value. If all the components are at zero the result is black; if all are at maximum, the result is white.

The threshold value of the pixel data and the particular percentage of the plurality of pixels may be selected as values which indicate an error in the connection between the image source and the display apparatus 108. For example, it is likely that an error has occurred in the connection when ninety nine percent (99%) have a zero (0) value, as nearly every pixel would lose the same color component. Thus, the threshold value and the particular percentage may be set at 0 and 99% respectively so that if 99% of the pixels in the display have a color component of a value which is triggered by a threshold of 0, the system recognizes that an error has occurred. Any value may be selected for the particular percentage and the threshold value depending upon the preferences of a user, dependent on the device being use, possibility of signal noise, or other reasons. For example, where signal noise is expected the threshold value may be selected as a value greater than zero. Any value less than or equal to the threshold value may indicate that an error has occurred. In certain embodiments, the threshold value may be triggered by pixel data having a value greater than the threshold value.

In response to determining that the pixel data for the first color component has a value which does not trigger the threshold value for the particular percentage of pixels in the frame, the color correction module may generate saved pixel data for the first color component.

The saved pixel data for color components are values for one or more color components in the plurality of pixels which are saved when the color correction module determines that the signal was successfully transmitted. For example, for a display which uses an RGB color model, the saved pixel data may include values for three color components including a red color component, a blue color component, and a green color component. The saved pixel data may be generated when the pixel data for one or more color components is determined to be transmitted without error. For example, the system may save pixel data for one or more particular color components when it determines that the pixel data for the color component is of a value which does not trigger the threshold value for the particular percentage of pixels.

The saved pixel data may be used for correcting transmission errors in frames subsequent to the first frame. In embodiments, the saved pixel data for the color component may be generated at least once after a threshold number of frames have been received. This may keep the saved pixel data relatively up to date as the color correction module is required to continually update the saved pixel data over time. For example, the saved pixel data may be generated at least once every thirty frames. Thus, the saved pixel data will be relatively recent and more likely to match in color correction, described further below.

The color correction module 110 may be configured to correct errors in one or more color components by generating substitute pixel data based on the saved pixel data. The color correction module 110 may generate substitute pixel data based on the saved pixel data in multiple ways. For example, the color correction module 110 may generate substitute pixel data for color components from the saved color component. In embodiments, the substitute pixel data for the color components may replace the one or more color components in the plurality of pixels in order to correct missing information in the current frame. This correction may make the image more legible and usable, especially in contrast with a single color image.

For example, as a document is being typed by a user, the display apparatus 108 updates the image to reflect changes made to a document. The display apparatus may generate the saved pixel data for the color components, as described herein, and store the last known good state for the plurality of pixels in the image. Suddenly, the whole display goes blue due to an unreliable cable being knocked accidentally. The color correction module 110 detects that pixel data values for a red color component and a green color component have dropped to zero for one hundred percent of the plurality of pixels. The color correction module 110 may then correct the pixel data for the red and green color components based on the saved pixel data color components. The correction may be made by substituting in the saved pixel data for the red and green components at the level they were at their last known good state. This may restore the projected image to a good state similar to before the signal was lost. In certain embodiments, the display apparatus 108 may display an indication that the color correction module 110 is active, so that the user knows that a problem may exist within the cable 106.

Described further herein, after the color correction module 110 displays the frame using the substitute pixel data, subsequent frames may result in different pixel data from an updated image. The color correction module 110 may recognize the change in pixel data based on working pixels. For example, if the system is substituting in saved pixel data for the red color component but the green and blue color components are working correctly, the system may recognize that the image has changed in subsequent frames when the values for the green and blue color components change (for example, as newly typed characters are displayed in a word processing application). The system may then identify substantially similar pixels to the changed pixels and copy the pixel data for the substantially similar pixels to the changed pixels. In embodiments, substantially similar pixels are those which share pixel data values for at least one color component.

For example, after substituting in red and green color components in a first frame, the color correction module 110 may identify that for a first pixel the pixel data for a subsequent second frame changes the properly functioning blue color component value. In response, the system may identify a substantially similar pixel to the changed pixel, and apply the red component and green component of the substantially similar pixel to the changed pixel.

Figure 2:
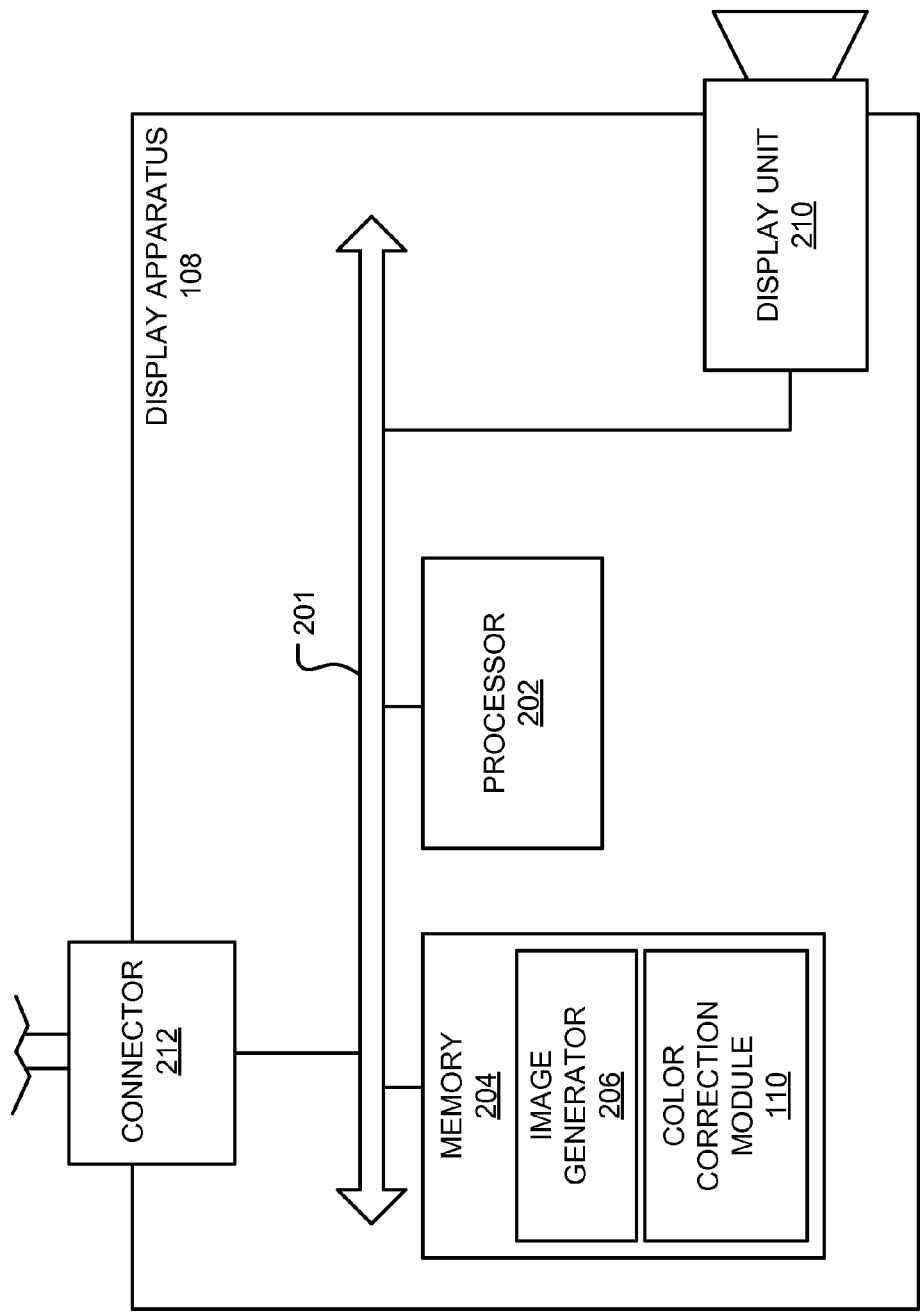
FIG. 2 depicts a display apparatus for image color correction according to embodiments of the present disclosure.

Referring now to FIG. 2, a display apparatus 108 may be seen according to embodiments of the present disclosure. The display apparatus 108 may include a processor 202 and a memory 204 including an image generator 206 and a color correction module 110. The display apparatus 108 may also include a display unit 210, a connector 212, and a bus 201 communicatively connecting the elements in the display apparatus 108.

The processor 202 may include one or more general-purpose programmable central processing units (CPUs). In embodiments, the display apparatus 108 may contain multiple processors 202. In certain embodiments the display apparatus 108 may be a single CPU system. The processor 202 may execute instructions stored in the memory 204 and may include one or more levels of on-board cache. The processor 202 may include various types of processors such as, digital signal processor (DSP) hardware, network processor, application specific integrated circuit (ASIC), field programmable gate array (FPGA), or other types of processors. The memory 204 may be coupled to the processor 202 via the bus 201.

The memory 204 may include a random-access semiconductor memory, storage device, or storage medium (either volatile or non-volatile) for storing or encoding data and programs. The memory 204 may be conceptually a single monolithic entity, but in other embodiments the memory 204 may be a more complex arrangement, such as a hierarchy of caches and other memory devices. The memory 204 may store data, instructions, modules, and other types of information, hereafter collectively referred to as "memory elements." Although the memory elements are illustrated as being contained within the memory 204 in the display apparatus 108, in other embodiments some or all of them may be on different devices and may be accessed remotely, e.g., via a network.

The display apparatus 108 may use virtual addressing mechanisms that allow the programs of the display apparatus 108 to behave as if they only have access to a large, single storage entity instead of access to multiple, smaller storage entities. Thus, while the memory elements are illustrated as being contained within the memory 204, these elements are not necessarily completely contained in the same storage device at the same time. Further, although the memory elements are illustrated as being separate entities, in other embodiments some of them, portions of some of them, or all of them may be packaged together.

In embodiments, the modules may include the image generator 206 and the color correction module 110. The modules may be instructions or statements that execute in the processor 202 to carry out embodiments of the present disclosure. The image generator 206 may continually generate new frames for the display unit 210 to display by synthesizing image data 104 (FIG. 1) and the frame being currently displayed by the display unit 210. The color correction module 110 may perform image color correction according to embodiments of the present disclosure.

The connector 212 may allow for wired connections with the display apparatus 108 and external devices. The connector may be, but is not limited to be, a USB connector, a VGA connector, an HDMI connector, a DVI connector, or other suitable connector. The display apparatus 108 may receive frames and pixel data from external devices, such as a computer, via the connector 212. The display unit 210 may display the image for the display apparatus. In embodiments, the display unit 210 may be a projector unit which projects the image data when the display apparatus 108 is a projector.

Figure 3:
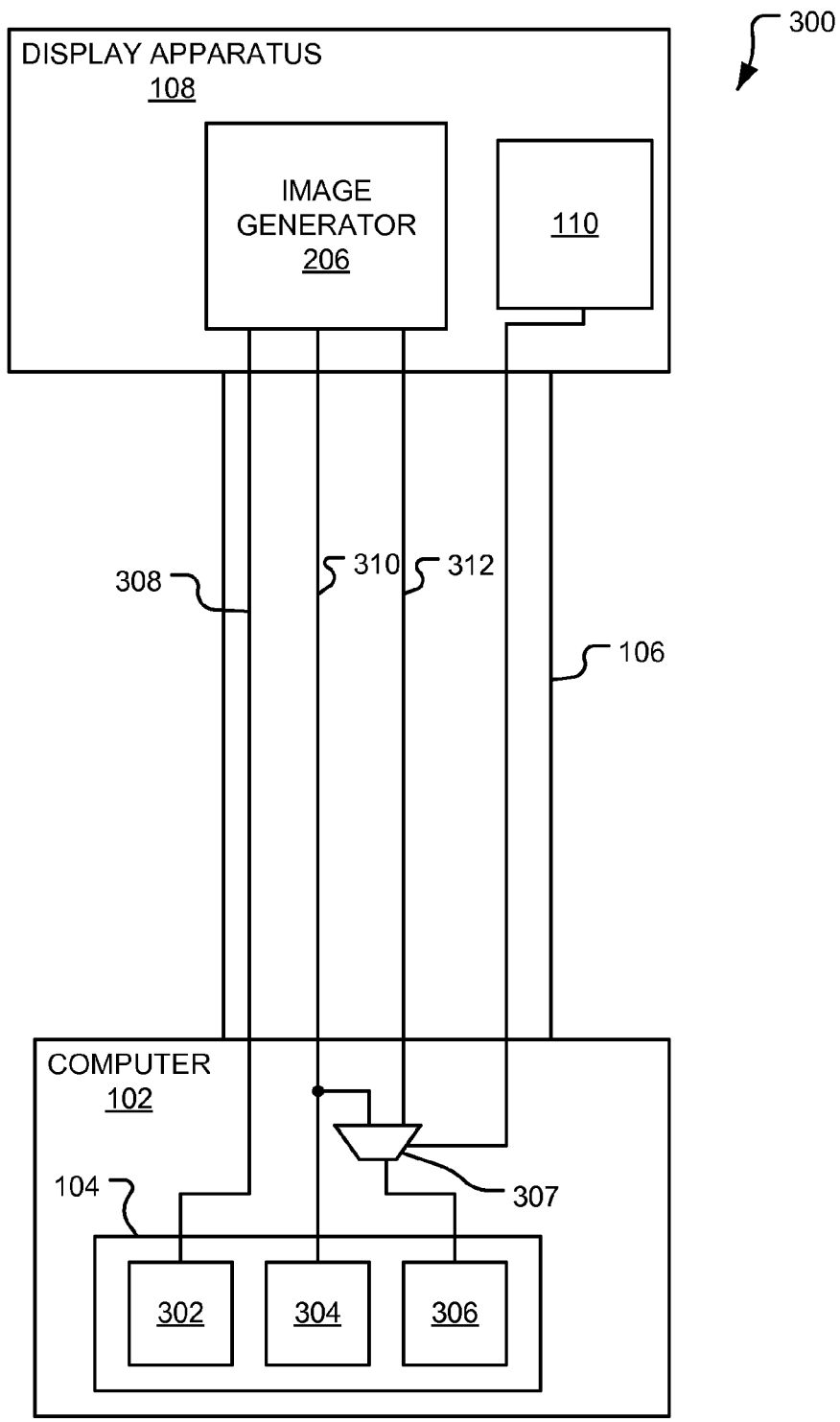
FIG. 3 depicts a system for image color correction according to embodiments of the present disclosure.

Referring now to FIG. 3 a system of image color correction may be seen according to embodiments of the present disclosure. The system 300 may include a display apparatus 108 having an image generator 206, and a color correction module 110. The system 300 may include computer 102 including image data 104. The image data 104 may include a first color component 302, a second color component 304, and a third color component 306. The computer 102 may also include multiplex module 307. The display apparatus 108 and the computer 102 are communicatively connected by cable 106 transmitting data across a first connection 308, a second connection 310, and a third connection 312.

The computer 102 and image data 104 may be the same or substantially similar as described herein. The first, second, and third color components 302-306 may be based on an RGB color model where the first color component 302 is red, the second color component 304 is green, and the third color component 306 is blue.

Each of the color components may be transmitted to the display apparatus 108 via the cable 106 to the image generator 206. The first color component 302 may be transmitted across the first connection 308. The second color component 304 may be transmitted across the second connection 310. The third color component 306 may be transmitted across the third connection 312. The display apparatus 108, the image generator 202, the color correction module 110, and the display unit 210 may be the same or substantially similar as described herein. As described herein, the image generator 206 may generate current frames for projection by the projection unit 210 based on the image data and the first, second, and third color components 302-306.

The color correction module 110 may be the same or substantially similar as described herein. As described herein, the color correction module may determine that the pixel data for one or more color components have a value triggered by a threshold value for a particular percentage of a plurality of pixels. The color correction module 110 may then determine that an error has occurred in the cable 106 connection between the display apparatus 108 and the computer 102. For example, pixel data for the first and second color components may be transmitted successfully for 99% of the pixels in the display apparatus 108, but the pixel data for the third color component may have zero values for 99% of the pixels.

In response, the color correction module 110 may cause the computer 102 to transmit pixel data for the third color component 306 across the second connection 310 in response to determining that the pixel data for the third color component 306 is less or equal to the threshold value for the particular percentage of pixels. In embodiments, the display apparatus 108 may be communicatively connected with the multiplex module 307. The multiplex module 307 may be hardware and/or software in the computer 102 configured to transmit color component information along different connections in the cable 106. In embodiments, the multiplex module 307 may be a combination of one or more physical multiplexers or de-multiplexers configured to switch between transmitting the color component data on the third connection and the second connection based on a control signal. The color correction module 110 may determine that there is an error in the third color component 306. In response the color correction module 110 may signal the multiplex module 307 to change the connection on which the third color component 306 is being transmitted.

In embodiments, the multiplex module 307 may split the color component such that the third color component 306 is transmitted on both the second connection 310 and the third connection 312. If the color correction module 110 subsequently detects a successful transmission of the third color component 306 across the third connection 312 the color correction module may signal the multiplex module 307 to stop splitting the signal and normal operation of the display apparatus 108 and the computer 102 may resume.

Referring now to FIG. 4A a table displaying implementation of color correction for pixels over multiple frames may be seen according to embodiments of the present disclosure. The table 400 shows color component values for at least four pixels (pixel 402, pixel 404, pixel 406, and pixel 408) over multiple frames 410-422. The table includes pixel data for a first color component 302, second color component 304, and third color component 306 for each frame and for each pixel. Pixel data for a color component is represented by a numerical value which indicates color, with zero indicating that no amount of the particular color component is represented. For example, in frame 410 there is no third color component 306 in pixel 402 because the data value for the third color component box in frame 410 is represented by a zero. However, pixels 404-408 have the third color component in frame 410 because the data values for each of their third color component boxes contain a value which does not trigger the threshold value of zero.

As described herein, the color correction module may generate saved color components for pixels when it is determined that the frame has a color component value which triggers a threshold for a particular percentage of pixels. At point 430 the color correction module detects that for the first, second, and third color components 302-306 each have a value which does not trigger a threshold value (f zero in this instance) and saves the color component information from frame 410 for each of the color components 302-306.

In frame 414 the part of the cable transmitting the third color component 306 malfunctions and the third color component 306 drops to a value of zero for each pixel 402-408. As described herein, the color correction module may detect that the third color component has a value triggered by the threshold value for the particular percentage of pixels. In response, the color correction module may select the saved color component to reinstate the third color component values to a last known good state. At point 432 the color correction module substitutes in pixel data for the third color component 306 for each pixel 402-408 and in frame 416 the third color component 306 is corrected.

At point 434 the cable starts working correctly again and the number of pixels receiving a third color component 306 which are not zero goes above a particular percentage. In response the color correction module reinstates the third color component information received via the cable and the signal starts to display normally again in frame 420.

Referring now to FIG. 4B a table displaying implementation of color correction for pixels over multiple frames may be seen according to embodiments of the present disclosure. The table 400 shows pixel data values for the color components 302-306 for at least four pixels (pixel 402, pixel 404, pixel 406, and pixel 408) over multiple frames 410-422. The table includes first color component 302, second color component 304, and third color component 306 for each frame and for each pixel. The color components 302, 304, 306 may be the same or substantially similar as described herein.

As described herein, the color correction module may generate saved pixel data for the color components for pixels 402-408 at point 430. In frame 414 the part of the cable transmitting the third color component 306 malfunctions and the pixel values for the third color component 306 drops to a value of zero for each pixel 402-408. As described herein, the color correction module may detect that the pixel values for the third color component 306 have a value triggered by the threshold value for the particular percentage of pixels. In response, the color correction module may select the saved pixel value for the color component to reinstate the third color component values to a last known good state. At point 432 the color correction module substitutes in the third color component 306 for each pixel 402-408 and in frame 416 the third color component 306 is corrected.

In frame 418 the first and second color components 302, 304 in pixel 408 changes as a new frame is produced. In embodiments, in response to changes in the color components between frames, the color correction module may identify substantially similar pixels within a particular range relative to pixels having changed color components. Once the color correction module identifies substantially similar pixels the color correction module may substitute the substantially similar pixel for the changed pixel. For example, in between frame 416 and frame 418 the data values for the first and second color components 302, 304 change. In response, the color correction module may identify a substantially similar pixel. In embodiments substantially similar pixels have at least one color component with a data value which is identical to the changed pixel. In certain embodiments, substantially similar pixels have at least two or more identical color components with the changed pixel. The color correction module identifies that in frame 418 pixel 402 has first and second color components 302-304 equal in value with pixel 408. Thus, pixel 402 and pixel 408 are substantially similar and at point 433 the color correction module substitutes the color component 306 of pixel 402 with color component 306 in pixel 408.

At point 434 the cable starts working correctly again and number of pixels receiving a third color component 306 which are not zero goes above a particular percentage. In response the color correction module reinstates the normal third color component information received via the cable and the signal starts to display normally again in frame 422.

Figure 5:
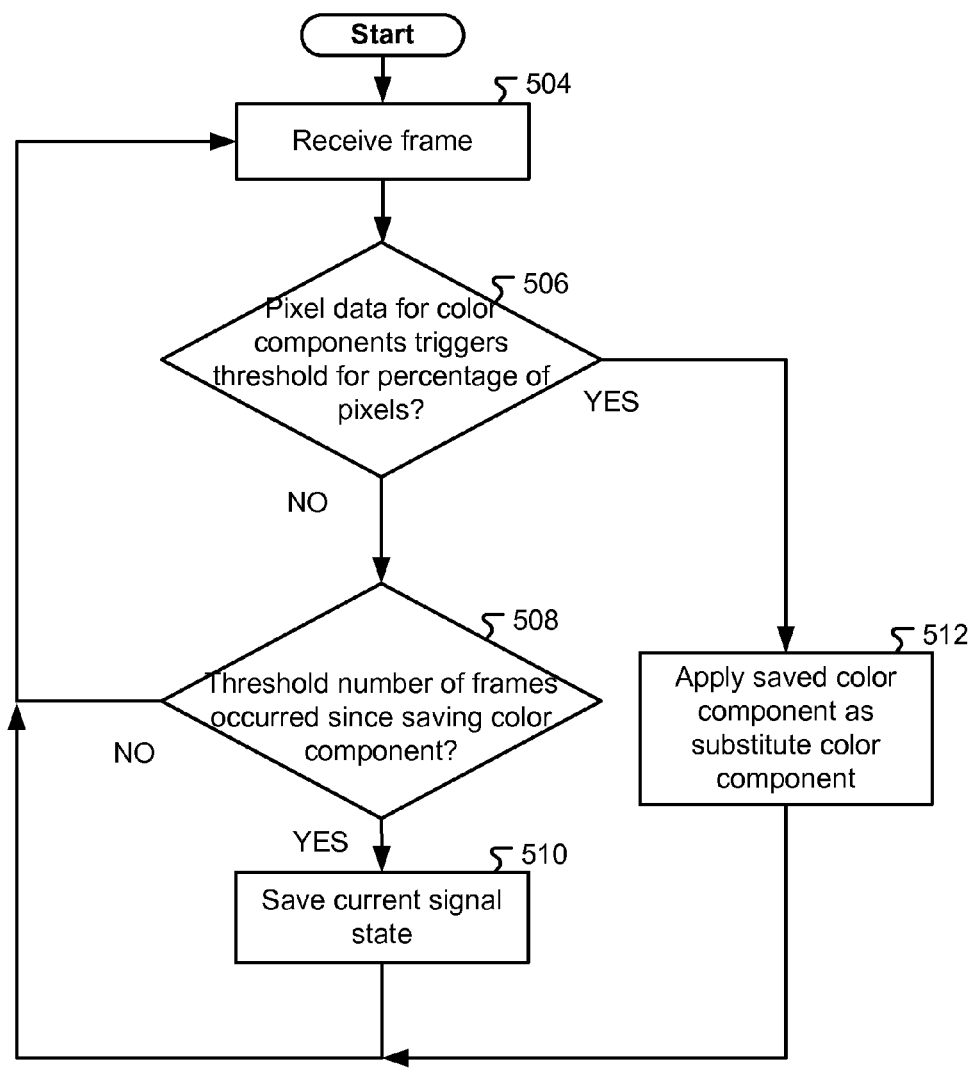
FIG. 5 depicts a flowchart diagram of a method of image color correction according to embodiments of the present disclosure.

Referring now to FIG. 5 a flowchart diagram of a method of image color correction may be seen according to embodiments of the present disclosure. In operation 504 a frame may be received. The frame may include pixel data for the color components for one or more pixels in the display apparatus, as described herein. If the pixel data for the color component have a value does not trigger a threshold value for a particular percentage of a plurality of pixels, then in decision block 506, the method 500 may progress to decision block 508.

As described herein, because the pixel values for the color component do not trigger a threshold value for the particular percentage of pixels, the signal is good and may be used to generate saved pixel data for the color component. If a threshold number of frames has passed since the previous saved color component has been generated then, in decision block 508, the method may progress to operation 510. In operation 510 the pixel values for the saved pixel data may be generated from the color component information received in the frame. The saved pixel data may be stored in memory in the display as described herein. The method 500 may then reset to operation 502 and a new frame may be received.

If the pixel data for the color component has a value is triggered by the threshold value for the particular percentage of pixels then in decision block 506 the method may progress to operation 512. In operation 512 the saved color component information may be used to generate a substitute color component. As described herein, the saved color component information may be substituted in for one or more color components which are deemed to be missing. The method 500 may then reset to operation 502 and a new frame may be received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of electronic image color correction comprising:
   receiving a first frame including pixel data for a first color component for a plurality of pixels;
   generating saved pixel data for the first color component;
   receiving a second frame subsequent to the first frame, the second frame including pixel data for the first color component for the plurality of pixels;
   generating, for at least four pixels, substitute pixel data for the first color component in response to determining that, in the second frame, the pixel data for the first color component is triggered by a threshold value for the first color component for a particular percentage of the plurality of pixels, the substitute pixel data being part of a pixel having identical color component values to color component values of corresponding pixels in the first frame for at least two color components of corresponding pixels in the first frame and generated based on the saved pixel data, and the threshold value including a color component value for an individual pixel; and displaying the second frame using the substitute pixel data for the first color component for the plurality of pixels.

2. The method of claim 1, wherein:
the saved pixel data for the first color component is generated by a method including:
saving pixel data for the first color component in the first frame as the saved pixel data.

3. The method of claim 2, wherein:
the saved pixel data is generated in response to determining that, in the first frame, the pixel data for the first color component is not triggered by the threshold value for the particular percentage of the plurality of pixels.

4. The method of claim 1, wherein the saved pixel data for the first color component is generated at least once after a threshold number of frames have been received.

5. The method of claim 1, further comprising:
receiving a third frame subsequent to the second frame, the third frame including pixel data for the first color component for the plurality of pixels;
displaying the third frame using the pixel data for the first color component received with the third frame in response to determining that, in the third frame, the pixel data for the first color component is not triggered by the threshold value for the particular percentage of the plurality of pixels.

6. The method of claim 1, wherein:
the first frame and second frame include pixel data for at least a first color component, a second color component, and a third color component for the plurality of pixels.

7. The method of claim 1, wherein the threshold value is triggered by pixel data which is less than or equal to the threshold value.

8. The method of claim 1, wherein the first frame and second frame include pixel data for a second color component for the plurality of pixels, and wherein the method further comprises:
receiving a third frame including pixel data for the first color component and the second color component, the third frame received subsequent to the second frame;
determining that in a first pixel of the plurality of pixels, the pixel data for the second color component in the third frame is changed, relative to the pixel data for the second color component in the second frame;
identifying a second pixel of the plurality of pixels within a range relative to the first pixel, the second pixel substantially similar to the first pixel; and
displaying, in the third frame, the first pixel using the pixel data for the first color component and the second color component of the second pixel.

9. The method of claim 1, wherein the threshold value is zero and the particular percentage of the plurality of pixels is 99.

10. A display apparatus communicatively connected to an image source, the display apparatus comprising:
a connector configured to receive a first frame and receive a second frame subsequent to the first frame, the first and second frames including pixel data for a first color component for a plurality of pixels;
a processor configured to:
generate saved pixel data for the first color component;
generate, for at least four pixels, substitute pixel data for the first color component in response to determining that, in the second frame, the pixel data for the first color component is triggered by a threshold value for the first color component for a particular percentage of the plurality of pixels, the substitute pixel data being part of a pixel having identical color component values to color component values of corresponding pixels in the first frame for at least two color components of corresponding pixels data in the first frame and generated based on the saved pixel data, and the threshold value including a color component value for an individual pixel; and
cause the display apparatus to display the second frame using the substitute pixel data for the first color component for the plurality of pixels; and
a memory configured to store the pixel data for the first color component and the saved pixel data.

11. The apparatus of claim 10, wherein the processor is further configured to:
store, in the memory, the pixel data for first color component in the first frame as the saved pixel data in response to determining that the pixel data for the first color component in the first frame is not triggered by the threshold value for the particular percentage of the plurality of pixels.

12. The apparatus of claim 10, wherein the saved pixel data for the first color component is generated at least once after a threshold number of frames have been received.

13. The apparatus of claim 10, wherein the connector is further configured to:
receive a third frame subsequent to the second frame, the third frame including pixel data for the first color component for the plurality of pixels; and
wherein the processor is further configured to:
cause the display apparatus to display the third frame using the pixel data for the first color component received with the third frame in response to determining that, in the third frame, the pixel data for the first color component is not triggered by the threshold value for the particular percentage of the plurality of pixels.

14. The apparatus of claim 10, wherein the threshold value is triggered by pixel data which is less than or equal to the threshold value.

15. A system of electronic image color correction comprising:
a computer configured to transmit pixel data for a first color component across a first connection and pixel data for a second color component across a second connection;
a display apparatus communicatively connected to the computer, the display apparatus configured to:
receive the pixel data for the first color component from across the first connection and the pixel data for the second color component from across the second connection; and
cause the computer to transmit, for at least four pixels, the pixel data for the first color component across the second connection in response to determining that the pixel data for the first color component is part of a pixel having identical color component values to color component values of corresponding pixels in a previous frame for at least two color components and is triggered by a threshold value for the first color component for a particular percentage of a plurality of pixels, the threshold value including a color component value for an individual pixel.

16. The system of claim 15, wherein the display apparatus includes:

a connector configured to:
  receive a first frame and receive a second frame subsequent to the first frame, the first and second frames including pixel data for a first color component for a plurality of pixels;
a processor configured to:
  generate saved pixel data for the first color component;
  generate substitute pixel data for the first color component in response to determining that, in the second frame, the pixel data for the first color component is triggered by a threshold value for a particular percentage of the plurality of pixels, the substitute pixel data generated based on the saved pixel data; and
  cause the display apparatus to display the second frame using the substitute pixel data for the first color component for the plurality of pixels; and
a memory configured to store the pixel data for the first color component and the saved pixel data.

17. The system of claim 16, wherein the processor is further configured to:
  store, in the memory, the pixel data for first color component in the first frame as the saved pixel data in response to determining that the pixel data for the first color component in the first frame is not triggered by the threshold value for the particular percentage of the plurality of pixels.

18. The system of claim 16, wherein the saved pixel data for the first color component is generated at least once after a threshold number of frames have been received.

19. The system of claim 16, wherein the connector is further configured to:
  receive a third frame subsequent to the second frame, the third frame including pixel data for the first color component for the plurality of pixels; and
  wherein the processor is further configured to:
cause the display apparatus to display the third frame using the pixel data for the first color component received with the third frame in response to determining that, in the third frame, the pixel data for the first color component is not triggered by the threshold value for the particular percentage of the plurality of pixels.

20. The system of claim 16, wherein the threshold value is triggered by pixel data which is less than or equal to the threshold value.

* * * * *